US012062320B2

(12) United States Patent
Kim et al.

(10) Patent No.: US 12,062,320 B2
(45) Date of Patent: Aug. 13, 2024

(54) PIXEL CIRCUIT, DRIVING METHOD OF PIXEL CIRCUIT, AND DISPLAY DEVICE INCLUDING PIXEL CIRCUIT

(71) Applicant: LG DISPLAY CO., LTD., Seoul (KR)

(72) Inventors: Hyoungsik Kim, Paju-si (KR); Wookyu Sang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/224,376

(22) Filed: Jul. 20, 2023

(65) Prior Publication Data

US 2024/0078959 A1 Mar. 7, 2024

(30) Foreign Application Priority Data

Sep. 5, 2022 (KR) ........................ 10-2022-0112241

(51) Int. Cl.
*G09G 3/20* (2006.01)

(52) U.S. Cl.
CPC ............. *G09G 3/2096* (2013.01); *G09G 3/20* (2013.01); *G09G 2300/0426* (2013.01); *G09G 2300/0819* (2013.01); *G09G 2300/0842* (2013.01); *G09G 2310/0294* (2013.01); *G09G 2310/08* (2013.01); *G09G 2320/0223* (2013.01); *G09G 2320/0233* (2013.01); *G09G 2320/0247* (2013.01); *G09G 2330/028* (2013.01); *G09G 2340/0435* (2013.01)

(58) Field of Classification Search
CPC ... G09G 3/30–3291; G09G 2300/0819; G09G 2300/0842–0871; G09G 2310/08
See application file for complete search history.

(56) References Cited

U.S. PATENT DOCUMENTS

| | | | | |
|---|---|---|---|---|
| 2017/0162113 A1* | 6/2017 | Lin | ...................... | G09G 3/3266 |
| 2021/0036088 A1* | 2/2021 | Jo | ...................... | H10K 59/131 |
| 2021/0366397 A1 | 11/2021 | Na | | |
| 2022/0208074 A1* | 6/2022 | Kim | ...................... | G09G 3/3241 |
| 2022/0230586 A1 | 7/2022 | Jeong | | |
| 2022/0335872 A1 | 10/2022 | Zhang et al. | | |

FOREIGN PATENT DOCUMENTS

| | | |
|---|---|---|
| KR | 10-2020-0130546 A | 11/2020 |
| KR | 10-2021-0143970 A | 11/2021 |

* cited by examiner

*Primary Examiner* — Amy Onyekaba
(74) *Attorney, Agent, or Firm* — Morgan, Lewis & Bockius LLP

(57) ABSTRACT

Embodiments of the present disclosure relate to a pixel circuit comprising: a light emitting device which emits light with a luminance corresponding to an amount of driving current applied thereto; a driving transistor which controls the amount of the driving current applied to the light emitting device; a storage capacitor which is connected to the driving transistor; a first transistor which is turned on according to a first scan signal and transmits a data voltage to the storage capacitor; and a second transistor which is turned on according to a second scan signal and diode-connects the driving transistor, wherein the driving transistor and the first transistor are low temperature poly-silicon (LTPS) thin film transistors, and wherein the second transistor is an oxide semiconductor thin film transistor.

20 Claims, 15 Drawing Sheets

PIXEL CIRCUIT, DRIVING METHOD OF PIXEL CIRCUIT, AND DISPLAY DEVICE INCLUDING PIXEL CIRCUIT

CROSS-REFERENCE TO RELATED APPLICATIONS

The present application claims priority to Korean Patent Application No. 10-2022-0112241, filed on Sep. 5, 2022, the entire contents of which is incorporated herein for all purposes by this reference.

BACKGROUND

Technical Field

The present disclosure relates to a pixel circuit, a driving method of the pixel circuit, and a display device including the pixel circuit.

Discussion of the Related Art

With the development of the information society, various demands for a display device are increasing. Various types of display devices such as a liquid crystal display, an organic light emitting diode display, etc., are being used.

An image which is displayed on the display device may be a still image or a moving image. The moving image may have various types such as a sports video, a game video, and a movie. The display device is driven in a variable refresh rate (VRR) mode in which a driving frequency is varied according to the type of image, thereby reducing power consumption and increasing the lifespan of the display device.

When a pixel circuit is driven at various refresh rates by applying the variable refresh rate mode, a luminance difference may occur between the pixel circuits due to different refresh rates, so that quality degradation such as image distortion, flicker, etc., may occur.

SUMMARY

Accordingly, embodiments of the present disclosure are directed to a pixel circuit, a driving method of the pixel circuit, and a display device including the pixel circuit that substantially obviates one or more of the problems due to limitations and disadvantages of the related art.

An aspect of the present disclosure is to provide a pixel circuit, a driving method of the pixel circuit, and a display device including the pixel circuit, which are capable of improving IR drop at the time of emitting light by sampling a threshold voltage of a driving transistor.

Another aspect of the present disclosure is provide a hybrid type pixel circuit capable of minimizing leakage of current by using an oxide semiconductor thin film transistor, a driving method of the pixel circuit, and a display device including the pixel circuit.

Another aspect of the present disclosure is provide a pixel circuit that receives an appropriate on-bias stress voltage in order to reduce hysteresis of a driving transistor in a variable refresh rate mode, a driving method of the pixel circuit, and a display device including the pixel circuit.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a pixel circuit comprises: a light emitting device which emits light with a luminance corresponding to an amount of driving current applied thereto; a driving transistor which controls the amount of the driving current applied to the light emitting device; a storage capacitor which is connected to the driving transistor; a first transistor which is turned on according to a first scan signal and transmits a data voltage to the storage capacitor; and a second transistor which is turned on according to a second scan signal and diode-connects the driving transistor. The driving transistor and the first transistor may be low temperature poly-silicon (LTPS) thin film transistors. The second transistor may be an oxide semiconductor thin film transistor.

A first electrode of the driving transistor may be connected to a high potential driving voltage, and a second electrode of the driving transistor may be connected to the light emitting device, and a gate electrode of the driving transistor may be connected to a first node. The first transistor may be connected between a second node and a data line that applies the data voltage, and a gate electrode of the first transistor may be connected to a first gate line that applies the first scan signal. The storage capacitor may be connected between the first node and the second node. The second transistor may be connected between the first node and the second electrode of the driving transistor, and a gate electrode of the second transistor may be connected to a second gate line that applies the second scan signal.

The pixel circuit may further include: a third transistor which is connected between the second node and a first reference voltage and has a gate electrode connected to an n-th light emission line that applies an n-th light emission control signal; and a fourth transistor which is connected between the light emitting device and a second reference voltage and has a gate electrode connected to a third gate line that applies a third scan signal.

The pixel circuit may further include: a fifth transistor which is connected between the high potential driving voltage and the first electrode of the driving transistor and has a gate electrode connected to an n+3-th light emission line that applies an n+3-th light emission control signal; and a sixth transistor which is connected between the second electrode of the driving transistor and the electrode of the light emitting device and has a gate electrode connected to the n-th light emission line that applies the n-th light emission control signal.

The pixel circuit may further include a seventh transistor which is connected between an on-bias stress voltage and the first electrode of the driving transistor and has a gate electrode connected to a fourth gate line that applies a fourth scan signal.

The seventh transistor is turned on at least once for one frame and applies the on-bias stress voltage to the driving transistor, and initializes characteristics of the driving transistor. The on-bias stress voltage may be varied to a different level according to a driving period within the one frame.

In another aspect, a method for driving a pixel circuit for one frame in a variable refresh rate mode may comprise: programming each pixel circuit with a predetermined data voltage during at least one refresh period; and controlling a light emitting device of the pixel circuit to emit light in correspondence to the programmed data voltage during a previous refresh period during at least one hold period. The refresh period and the hold period each may include at least one on-bias stress period in which an on-bias stress voltage is applied to a driving transistor of the pixel circuit and characteristics of the driving transistor are reset. The on-bias stress voltage may be varied in each of the on-bias stress periods.

The refresh period may include: an initial period in which a data voltage stored in advance in the pixel circuit is initialized; a sampling and programming period in which the data voltage is programmed into the pixel circuit; a light emission period in which the light emitting device emits light in correspondence to the data voltage programmed into the pixel circuit; and the on-bias stress period which is disposed at least once before the light emission period.

The on-bias stress period may include: a first on-bias stress period which is disposed between the initial period and the sampling and programming period and in which the on-bias stress voltage of a first level is applied to the driving transistor; and a second on-bias stress period which is disposed between the sampling and programming period and the light emission period and in which the on-bias stress voltage of a second level higher than the first level is applied to the driving transistor.

The hold period may include: a light emission period in which the light emitting device emits light in correspondence to the programmed data voltage during the previous refresh period; and the on-bias stress period which is disposed at least once before the light emission period.

The on-bias stress period may include: a third on-bias stress period which is disposed before the light emission period and in which the on-bias stress voltage of a third level that is higher than the first level and is lower than the second level is applied to the driving transistor; and a fourth on-bias stress period which is disposed between the third on-bias stress period and the light emission period and in which the on-bias stress voltage of a fourth level that is the same as the third level is applied to the driving transistor.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
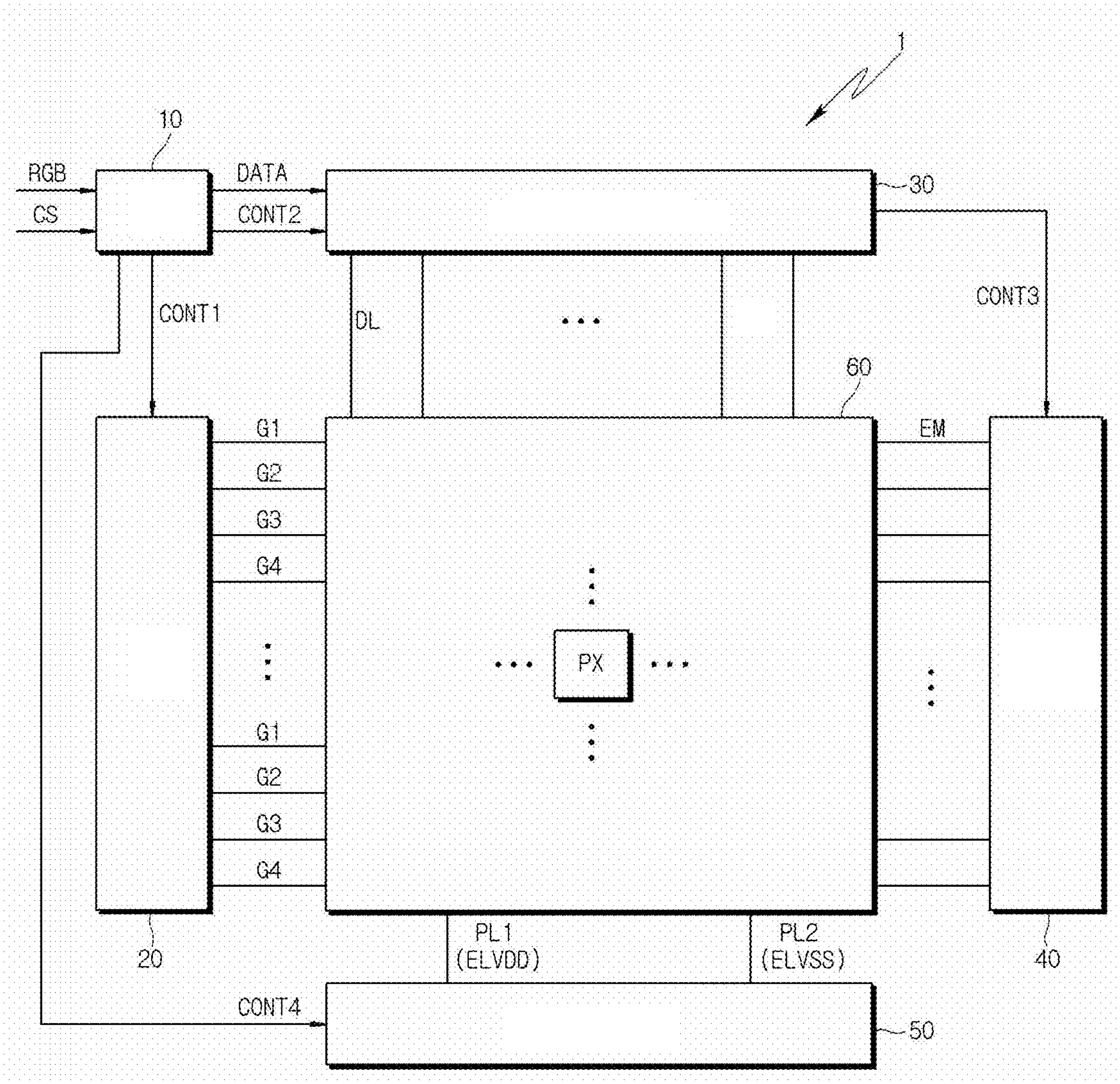
FIG. 1 is a block diagram showing a display device according to an embodiment.

Hereinafter, embodiments of the present disclosure will be described with reference to the accompanying drawings. In this specification, when it is mentioned that a component (or region, layer, portion) "is on", "is connected to", or "is combined with" another component, terms "is on", "connected to", or "combined with" mean that a component may be directly connected to/combined with another component or mean that a third component may be disposed between them.

The same reference numerals correspond to the same components. Also, in the drawings, the thicknesses, ratios, and dimensions of the components are exaggerated for effective description of the technical details. A term "and/or" includes all of one or more combinations that related configurations can define.

While terms such as the first and the second, etc., can be used to describe various components, the components are not limited by the terms mentioned above. The terms are used only for distinguishing between one component and other components. For example, the first component may be designated as the second component without departing from the scope of rights of various embodiments. Similarly, the second component may be designated as the first component. An expression of a singular form includes the expression of plural form thereof unless otherwise explicitly mentioned in the context.

Terms such as "below", "lower", "above", "upper" and the like are used to describe the relationships between the components shown in the drawings. These terms have relative concepts and are described based on directions indicated in the drawings.

In the present specification, it should be understood that the term "include" or "comprise" and the like is intended to specify characteristics, numbers, steps, operations, components, parts or any combination thereof described in the specification, and intended not to previously exclude the possibility of existence or addition of at least one other characteristics, numbers, steps, operations, components, parts or any combination thereof.

FIG. 1 is a block diagram showing a display device according to an embodiment.

Referring to FIG. 1, the display device 1 includes a timing controller 10, a gate driver 20, a data driver 30, a light emitting driver 40, a power supply 50, and a display panel 60.

The timing controller 10 may receive an image signal RGB and a control signal CS from an external host system. The image signal RGB may include a plurality of gradation data. The control signal CS may include, for example, a horizontal synchronization signal, a vertical synchronization signal, and a main clock signal.

The timing controller 10 may process the image signal RGB and the control signal CS in conformity with the operating conditions of the display panel 60, and may generate and output image data DATA, a gate drive control signal CONT1, and a data drive control signal CONT2, a light emission drive control signal CONT3, and a power supply control signal CONT4.

The gate driver 20 may generate scan signals on the basis of the gate drive control signal CONT1 output from the timing controller 10. The gate driver 20 may provide the generated scan signals to pixel circuits PX through a plurality of gate lines G1 to G4.

The data driver 30 may generate data signals on the basis of the data drive control signal CONT2 and the image data DATA output from the timing controller 10. The data driver 30 may provide the generated data signals to the pixel circuits PX through a plurality of data lines DL.

The light emitting driver 40 may generate light emission control signals on the basis of the light emission drive control signal CONT3 output from the timing controller 10. The light emitting driver 40 may provide the generated scan signals to the pixel circuits PX through a plurality of light emission lines EM.

The power supply 50 may generate a high potential driving voltage ELVDD and a low potential driving voltage ELVSS which are to be supplied to the display panel 60 on the basis of the power supply control signal CONT4. The power supply 50 may supply the generated driving voltages ELVDD and ELVSS to the pixel circuits PX through corresponding power lines PL1 and PL2.

A plurality of pixel circuits PX (or referred to as sub-pixel circuits) is disposed on the display panel 60. The pixel circuits PX may be, for example, arranged in the form of a matrix on the display panel 60. The pixel circuits PX disposed in one pixel row are connected to the same gate lines G1 to G4 and light emission line EM, and the pixel circuits PX disposed in one pixel column are connected to the same data line DL. The pixel circuits PX may emit light with a luminance corresponding to the scan signal and data signal provided through the gate lines G1 to G4 and the data lines DL, in response to the light emission control signal applied through the light emission line EM.

In one embodiment, each pixel circuit PX may display any one of red, green, and blue colors. In another embodiment, each pixel circuit PX may display any one of cyan, magenta, and yellow colors. In various embodiments, each pixel circuit PX may display any one of red, green, blue, and white colors.

The timing controller 10, the gate driver 20, the data driver 30, the light emitting driver 40, and the power supply 50 may be each composed of a separate integrated circuit (IC), or may be configured as an IC in which at least some of them are integrated. Also, at least one of the gate driver 20 and the light emitting driver 40 may be formed in an in-panel method where it is formed integrally with the display panel 60.

Figure 2:
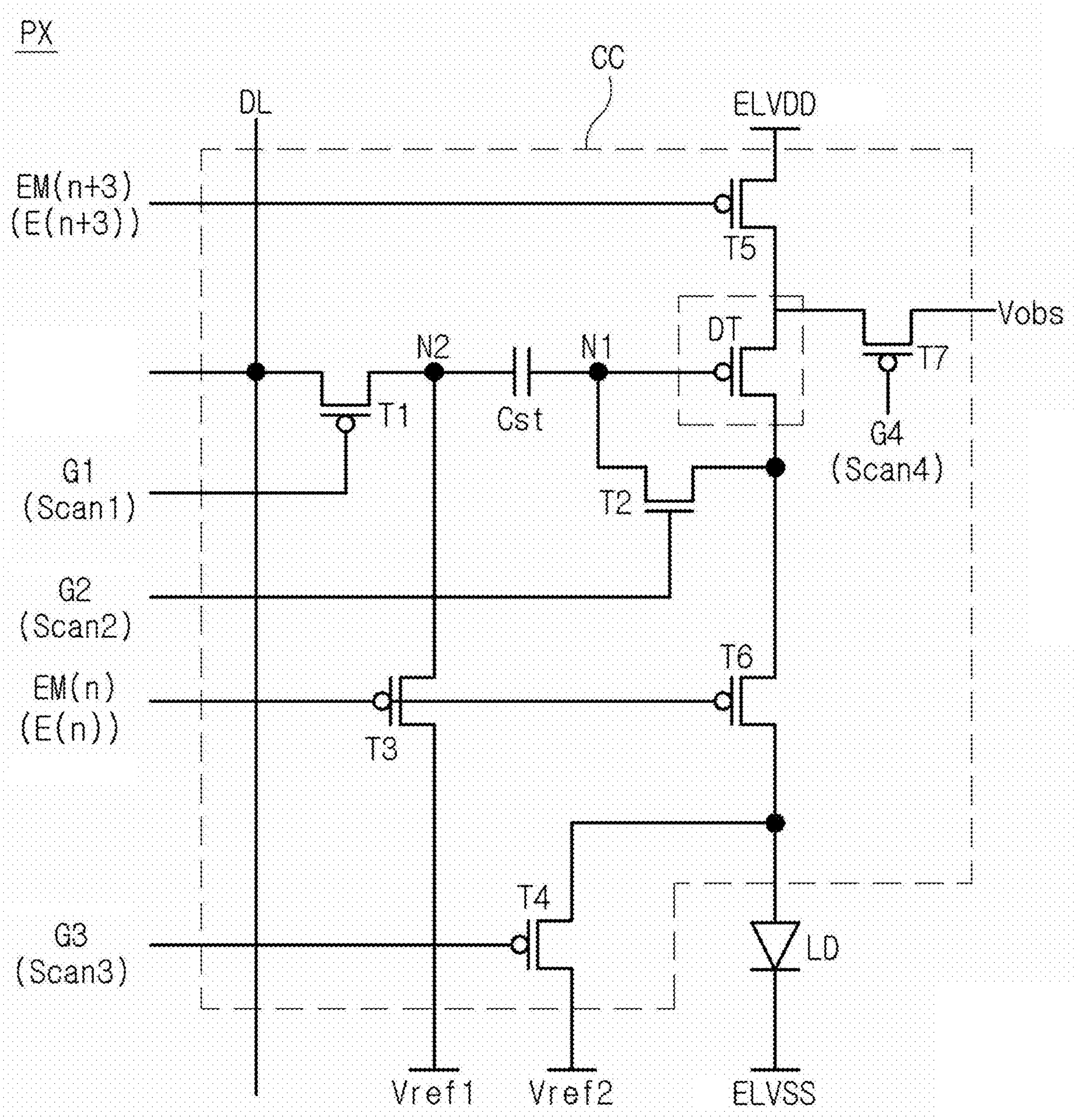
FIG. 2 is a circuit diagram of a pixel circuit according to the embodiment.

FIG. 2 is a circuit diagram of the pixel circuit according to the embodiment. For convenience of description, a pixel circuit connected to an n-th pixel row is shown in FIG. 2 as an example.

Referring to FIG. 2, the pixel circuit PX according to the embodiment may include a driving transistor DT, a light emitting device LD connected to the driving transistor DT, and a control circuit CC for controlling the amount of driving current to be applied to the light emitting device LD through the driving transistor DT. For example, the control circuit CC may include first to seventh transistors T1 to T7 and a storage capacitor Cst.

A first electrode (e.g., source electrode) of the driving transistor DT is connected to the high potential driving voltage ELVDD, and a second electrode (e.g., drain electrode) is connected between anode electrodes of the light emitting device LD. A gate electrode of the driving transistor DT is connected to a first node N1. The driving transistor DT is turned on according to a voltage applied to the first node N1 to control the amount of driving current flowing from the high potential driving voltage ELVDD to the light emitting device LD.

The first transistor T1 is connected between a second node N2 and the data line DL. A gate electrode of the first transistor T1 is connected to the first gate line G1. The first transistor T1 may be turned on in response to a first scan signal applied to the first gate line G1. When the first transistor T1 is turned on, a data voltage applied to the data line DL may be applied to the second node N2.

The storage capacitor Cst is connected between the first node N1 and the second node N2. The storage capacitor Cst may store a voltage corresponding to a voltage difference between the first node N1 and the second node N2. In other words, a first capacitor C1 can control the voltages of the first node N1 and the second node N2.

The second transistor T2 is connected between the second electrode of the driving transistor DT and the first node N1. A gate electrode of the second transistor T2 is connected to the second gate line G2. The second transistor T2 is turned on in response to a second scan signal Scan2 applied to the second gate line G2 to connect the second electrode and the gate electrode of the driving transistor DT.

The third transistor T3 is connected between the second node N2 and a first reference voltage Vref1. A gate electrode of the third transistor T3 is connected to the light emission lines EM(n). The third transistor T3 may be turned on in response to an n-th light emission control signal E(n) applied to an n-th light emission line EM(n). When the third transistor T3 is turned on, the first reference voltage Vref1 may be applied to the second node N2.

The fourth transistor T4 is connected between the anode electrode of the light emitting device LD and a second reference voltage Vref2. A gate electrode of the fourth transistor T4 is connected to the third gate line G3. The gate electrode of the fourth transistor T4 may be turned on in response to a third scan signal Scan3 applied to the third gate line G3. When the fourth transistor T4 is turned on, the second reference voltage Vref2 may be applied to the anode electrode of the light emitting device LD.

The third transistor T3 and the fourth transistor T4 are provided to initialize the second node N2 of the pixel circuit PX and the anode electrode of the light emitting device LD.

The fifth transistor T5 is connected between the high potential driving voltage ELVDD and the first electrode of the driving transistor DT. A gate electrode of the fifth transistor T5 is connected to an n+3-th light emission line EM(n+3). The fifth transistor T5 may be turned on in response to an n+3-th light emission control signal E(n+3) applied to the n+3-th light emission line EM(n+3). When the fifth transistor T5 is turned on, the high potential driving voltage ELVDD and the first electrode of the driving transistor DT may be connected.

The sixth transistor T6 is connected between the second electrode of the driving transistor DT and the anode electrode of the light emitting device LD. A gate electrode of the sixth transistor T6 is connected to the n-th light emission line EM(n). The sixth transistor T6 may be turned on in response to the n-th light emission control signal E(n) applied to the n-th light emission line EM(n). When the sixth transistor T6 is turned on, the light emitting device LD and the second electrode of the driving transistor DT may be connected.

The fifth transistor T5 and the sixth transistor T6 are turned on according to the light emission control signal E of the pixel circuit PX, and a current path flowing from the high potential driving voltage ELVDD to the light emitting device LD is formed.

The seventh transistor T7 is connected between an on-bias stress voltage Vobs and the first electrode of the driving transistor DT. A gate electrode of the seventh transistor T7 is connected to the fourth gate line G4. The seventh transistor T7 may be turned on in response to a fourth scan signal Scan4 applied to the fourth gate line G4. When the seventh transistor T7 is turned on, the on-bias stress voltage Vobs may be applied to the first electrode of the driving transistor DT.

The anode electrode of the light emitting device LD may be connected to the driving transistor DT, and a cathode electrode of the light emitting device LD may be connected to the low potential driving voltage ELVSS. When the driving transistor DT, the fifth transistor T5, and the sixth transistor T6 are turned on, a current path is formed between the high potential driving voltage ELVDD and the low potential driving voltage ELVSS, so that driving current may flow to the light emitting device LD. The light emitting device LD may emit light with a luminance corresponding to the amount of the applied driving current.

In the embodiment shown in FIG. 2, the pixel circuit PX includes an oxide semiconductor thin film transistor and a low temperature poly-silicon (LTPS) thin film transistor.

The oxide semiconductor thin film transistor includes a gate electrode, a source electrode and a drain electrode. The oxide semiconductor thin film transistor has an active layer formed of an oxide semiconductor. Here, the oxide semiconductor may be set to an amorphous or crystalline oxide semiconductor. The oxide semiconductor thin film transistor may be composed of an N-type transistor. The oxide semiconductor thin film transistors can be processed at low temperatures and has a lower charge mobility than that of LTPS thin film transistor. Such an oxide semiconductor thin film transistor has excellent off-current characteristics.

The LTPS thin film transistor includes a gate electrode, a source electrode and a drain electrode. The LTPS thin film transistor has an active layer formed of polysilicon. Such an LTPS thin film transistor may be composed of a P-type thin film transistor or an N-type thin film transistor. In the embodiment, it is assumed that the LTPS thin film transistor is composed of a P-type transistor. The LTPS thin film transistor has a high electron mobility, and thus, has fast drive characteristics.

In the embodiment of FIG. 2, the second transistor T2 is composed of the oxide semiconductor thin film transistor, and the driving transistor DT, the first, third to seventh transistors T1, T3 to T7 are composed of the LTPS thin film transistor. Accordingly, in the embodiment of FIG. 2, a first level (e.g., high level) of the second scan signal Scan2 provided to the gate electrode of the second transistor T2 is set to a gate-on level, and the second scan signal Scan2 is set to the gate-on level. Second levels (e.g., low level) of the first, third, and fourth scan signals Scan2, Scan3, and Scan4 provided to the first, fifth, and seventh transistors T1, T5, and T7, and the light emission control signals E(n) and E(n+3) may be set to the gate-on level.

In the embodiment, the second transistor T2 is composed of the oxide semiconductor thin film transistor having excellent off-current characteristics, that is, an N-type transistor. In a case where the driving transistor DT is driven and a driving current is supplied from the high potential driving voltage ELVDD to the light emitting device LD via the fifth and sixth transistors T5 and T6, when the low potential driving voltage ELVSS is set to be lower than a random value or when the display device 1 is driven at a low frequency, a predetermined leakage current may occur from the gate electrode of the driving transistor DT by the second transistor T2. In this case, the data voltage cannot be maintained for one frame period, and an image having a desired luminance cannot be displayed. When the second transistor T2 is formed of the oxide semiconductor thin film transistor having excellent off-current characteristics, leakage current generated by the second transistor T2 can be prevented.

Figure 3:
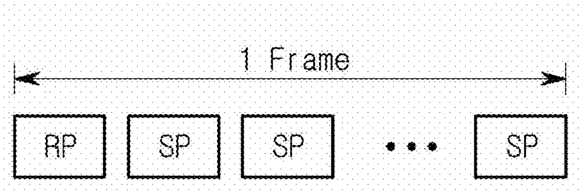
FIG. 3 is a view showing a driving method of the pixel circuit according to the embodiment.

FIG. 3 is a view showing a driving method of the pixel circuit according to the embodiment.

In the embodiment, the display device 1 may be driven in a variable refresh rate (VRR) mode in which a driving frequency can be varied. For example, the display device 1 may be driven at a higher or lower refresh rate than a predetermined reference refresh rate. It can be referred to as "low-speed driving" that the display device 1 is driven at a refresh rate lower than the reference refresh rate, and can be referred to as "high-speed driving" that the display device 1 is driven at a refresh rate higher than the reference refresh rate. The refresh rate may be determined according to the type of displayed image, etc., and is not limited thereto.

Referring to FIG. 3 together with FIG. 1, the timing controller 10 may generate the control signals CONT1 to CONT4 such that the pixel circuit PX can be driven at various refresh rates. For example, the timing controller 10 can vary the refresh rate by changing the frequency of a clock signal included in the control signals CONT1 to CONT4, by adjusting the timing of a horizontal synchronization signal or a vertical synchronization signal, or by driving the gate driver 20 in a mask manner.

In the variable refresh rate mode, one frame may be formed through a combination of at least one refresh period RP and at least one hold period HP. During the refresh period RP, each pixel circuit PX is programmed with a new data voltage Vdata, and the light emitting device LD of the pixel circuit PX may emit light in correspondence to the programmed data voltage Vdata. The refresh period RP may also be referred to as a refresh frame. A process of applying the new data voltage Vdata to the pixel circuit PX during the hold period HP is omitted. Therefore, the hold period may be referred to as a skip period. In the embodiment, during the hold period HP, the light emitting device LD of each pixel circuit PX may emit light in correspondence to the data voltage Vdata programmed in a previous refresh period RP. Also, during the hold period HP, the anode electrode of the light emitting device LD may be reset to a predetermined reference voltage. In this embodiment, the hold period HP may be referred to as an anode initialization period or an anode initialization frame.

In the embodiment, in order to vary the refresh rate, the length of one frame can be varied by adjusting the number or length of hold periods HP. Then, a sufficient length of the refresh period RP is obtained, so that the data voltage Vdata can be stably programmed. However, the embodiment is not limited thereto, and in various other embodiments, the length or number of refresh periods RP may be variably adjusted.

Figure 4:
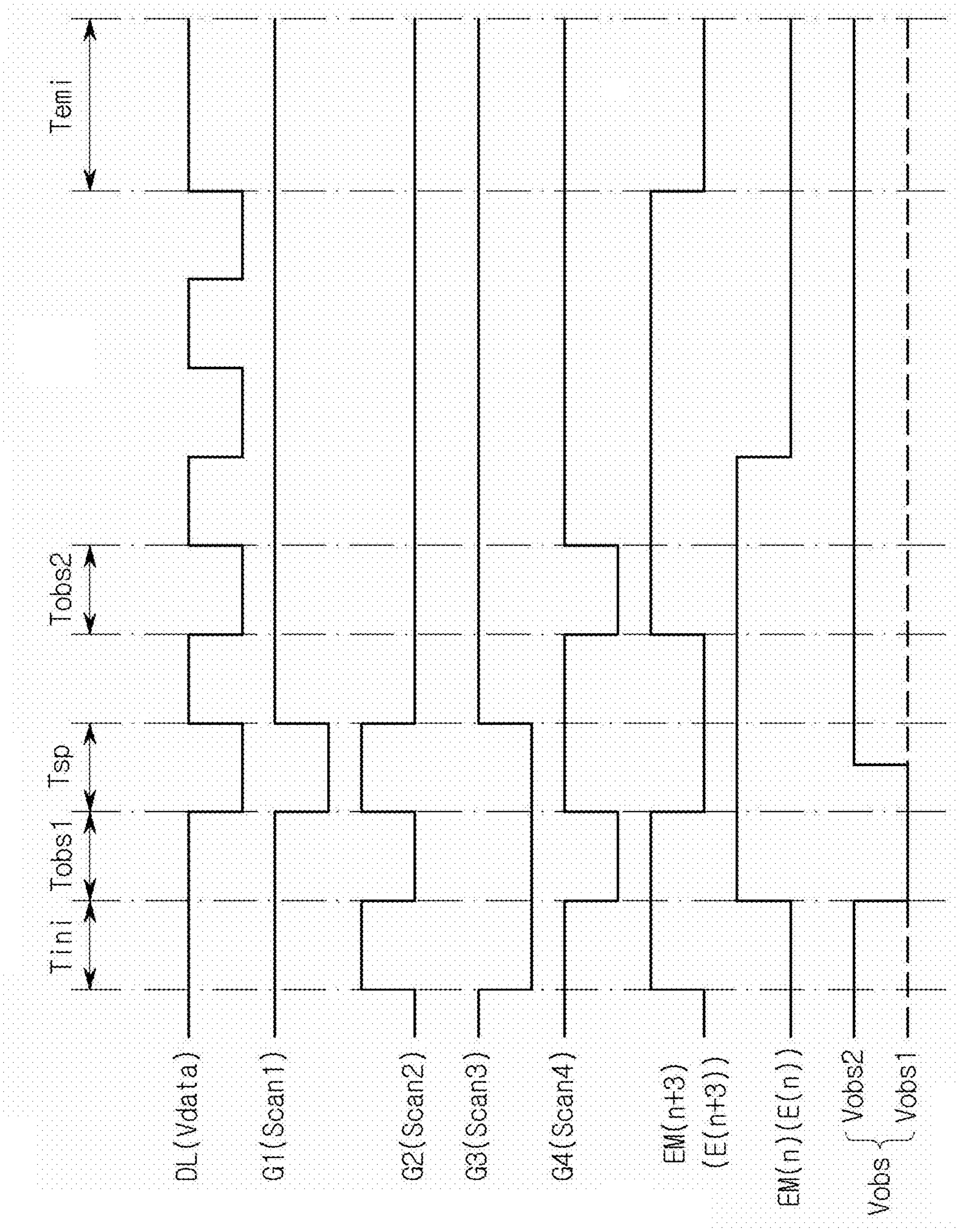
FIG. 4 is a timing diagram showing the driving method in a refresh period according to the embodiment.

FIG. 4 is a timing diagram showing the driving method in the refresh period according to the embodiment. FIGS. 5 to 9 are circuit diagrams for describing operations in the refresh period of the pixel circuit according to the embodiment.

Referring to FIG. 4, the refresh period RP includes an initial period Tini, a first on-bias stress period Tobs1, a sampling and programming period Tsp, a second on-bias stress period Tobs2, and a light emission period Temi may be included.

Figure 5:
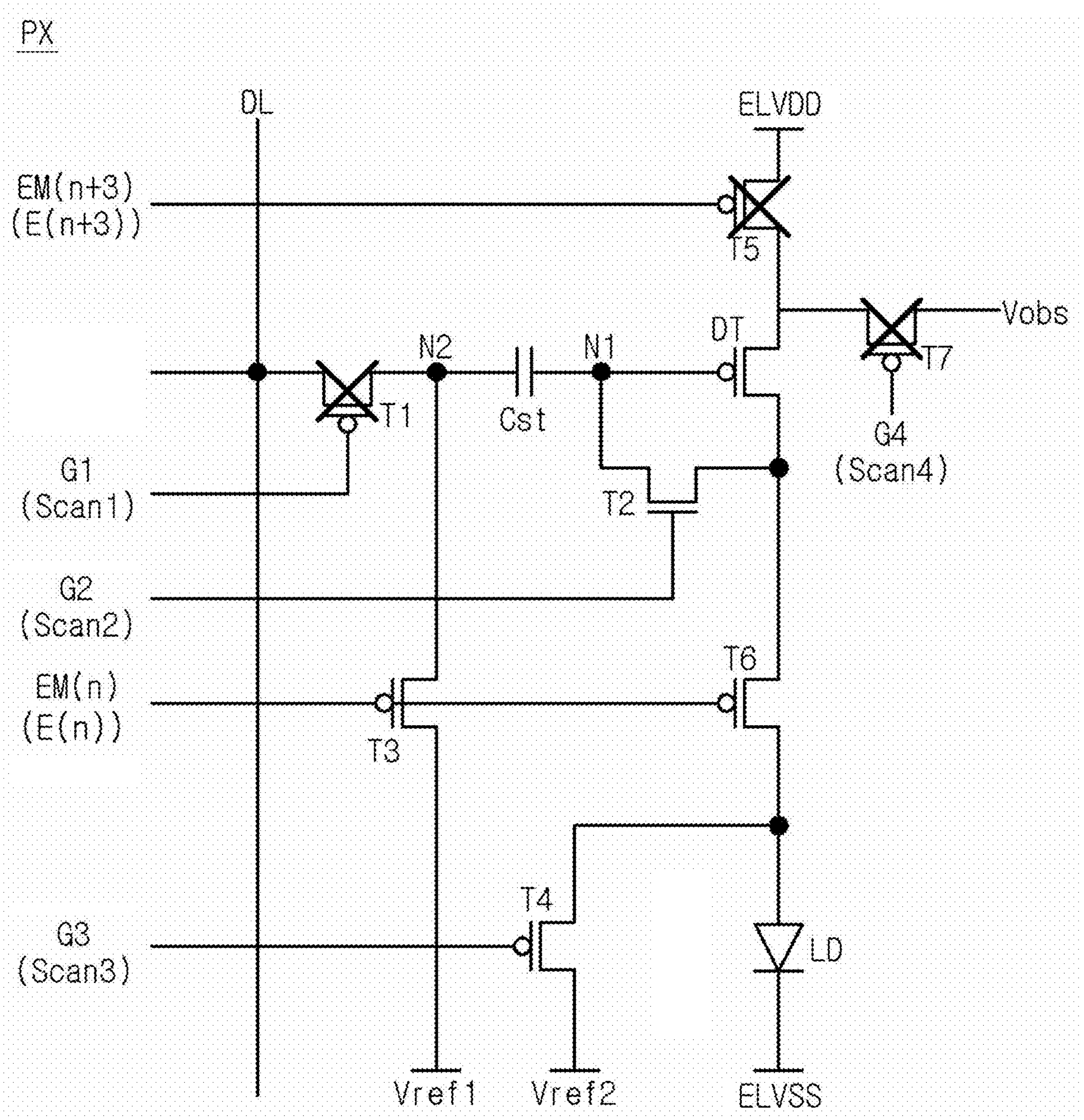
FIGS. 5 to 9 are circuit diagrams for describing operations in the refresh period of the pixel circuit according to the embodiment.

During the initial period Tini, the second scan signal Scan2 of a turn-on level is applied to the second gate line G2, and the third scan signal Scan3 of the turn-on level is applied to the third gate line G3. The n-th light emission control signal E(n) is applied to the n-th light emission line EM(n). Accordingly, as shown in FIG. 5, the second transistor T2, the third transistor T3, the fourth transistor T4, and the sixth transistor T6 are turned on. Then, the first reference voltage Vref1 is applied to the second node N2 through the third transistor T3, and the second reference voltage Vref2 is applied to the first node N1 through the second transistor T2, the fourth transistor T4, and the sixth transistor T6. As a result, the second electrode and the gate electrode of the driving transistor DT are initialized to the second reference voltage Vref2. That is, during the initial period Tini, the data voltage stored in advance in the pixel circuit PX, e.g., the storage capacitor Cst, may be initialized.

The second reference voltage Vref2 may be selected within a range of a voltage that is much lower than an operating voltage of the light emitting device LD, and may be set to a voltage that is lower than or equal to the low potential driving voltage ELVSS. Also, the second reference voltage Vref2 may be set low enough to turn on the P-type thin film transistor.

The first on-bias stress period Tobs1 is a period in which on-bias stress voltage is applied to the first electrode of the driving transistor DT.

The driving transistor DT may have hysteresis in which characteristics of the driving transistor change in a current frame according to the operation state of the driving transistor in a previous frame. For example, even if a data voltage having the same voltage level is applied to the driving transistor DT, driving currents having different magnitudes may be generated according to the operation state in the previous frame.

In the on-bias stress period, in order to reduce such hysteresis, the on-bias stress voltage is applied to the driving transistor DT to initialize the characteristics of the transistor, for example, a threshold voltage Vth to a constant state. Accordingly, flicker caused by hysteresis is prevented, and thus, the luminance of the display panel 60 can be uniformly controlled.

The on-bias stress period may be included at least once before the light emission period Temi within one frame. Here, the operation may be performed in the first on-bias stress period Tobs1 before the sampling and programming period Tsp. In various embodiments, the on-bias stress period may be before the initial period Tini or between the initial period Tini and the sampling and programming period Tsp. In this embodiment, the first on-bias stress period Tobs1 is between the initial period Tini and the sampling and programming period Tsp.

Figure 6:
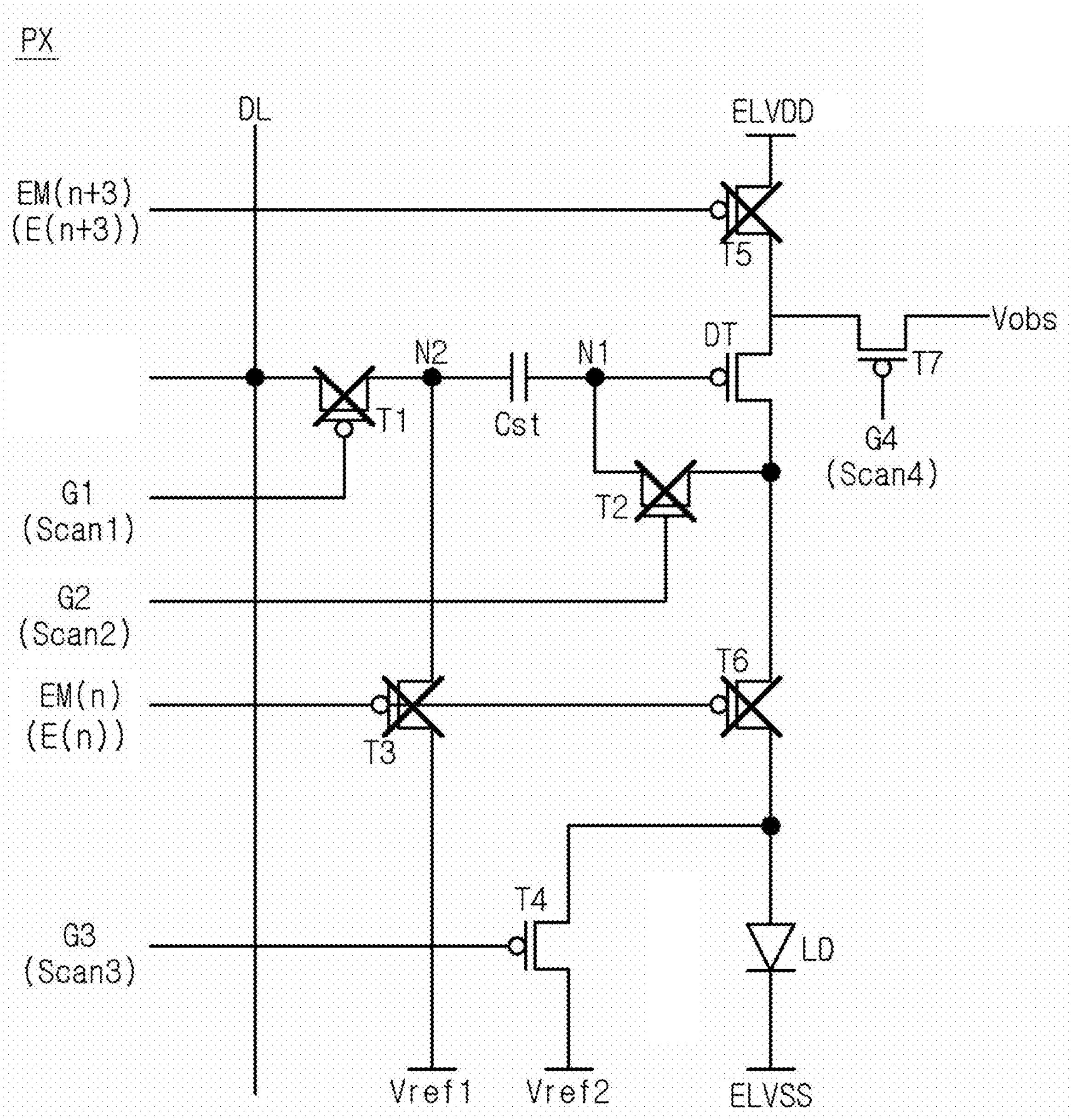

During the first on-bias stress period Tobs1, the third scan signal Scan3 of the turn-on level is applied to the third gate line G3, and the fourth scan signal Scan4 of the turn-on level is applied to the fourth gate line G4. Accordingly, as shown in FIG. 6, the fourth transistor T4 and the seventh transistor T7 are turned on.

Then, the second reference voltage Vref2 is applied to the anode electrode of the light emitting device LD through the fourth transistor T4 to initialize the anode electrode. In the embodiment, the second reference voltage Vref2 may be set to a voltage that is lower than or equal to the low potential driving voltage ELVSS. Accordingly, the light emitting device LD may not be turned on and the anode electrode may be reset.

Also, the on-bias stress voltage Vobs may be applied to the first electrode (i.e., the source electrode) of the driving transistor DT through the seventh transistor T7. Since the gate electrode of the driving transistor DT is initialized to the second reference voltage Vref2 during the initial period Tini, the on-bias stress voltage applied to the driving transistor DT during the first on-bias stress period Tobs1 may correspond to a potential difference between the second reference voltage Vref2, that is, the voltage of the gate electrode, and the on-bias stress voltage Vobs, that is, the voltage of the source electrode. As the potential difference increases, the on-bias stress voltage applied to the driving transistor DT increases. Accordingly, the on-bias stress voltage Vobs having an appropriate magnitude may be selected such that an excessive on-bias stress voltage is not applied to the driving transistor DT. In the embodiment, the second reference voltage Vref2 is about 2 V, and when the on-bias stress voltage of about 4 V is to be applied to the driving transistor DT, the on-bias stress voltage Vobs may be set to about 6 V (first level).

Figure 7:
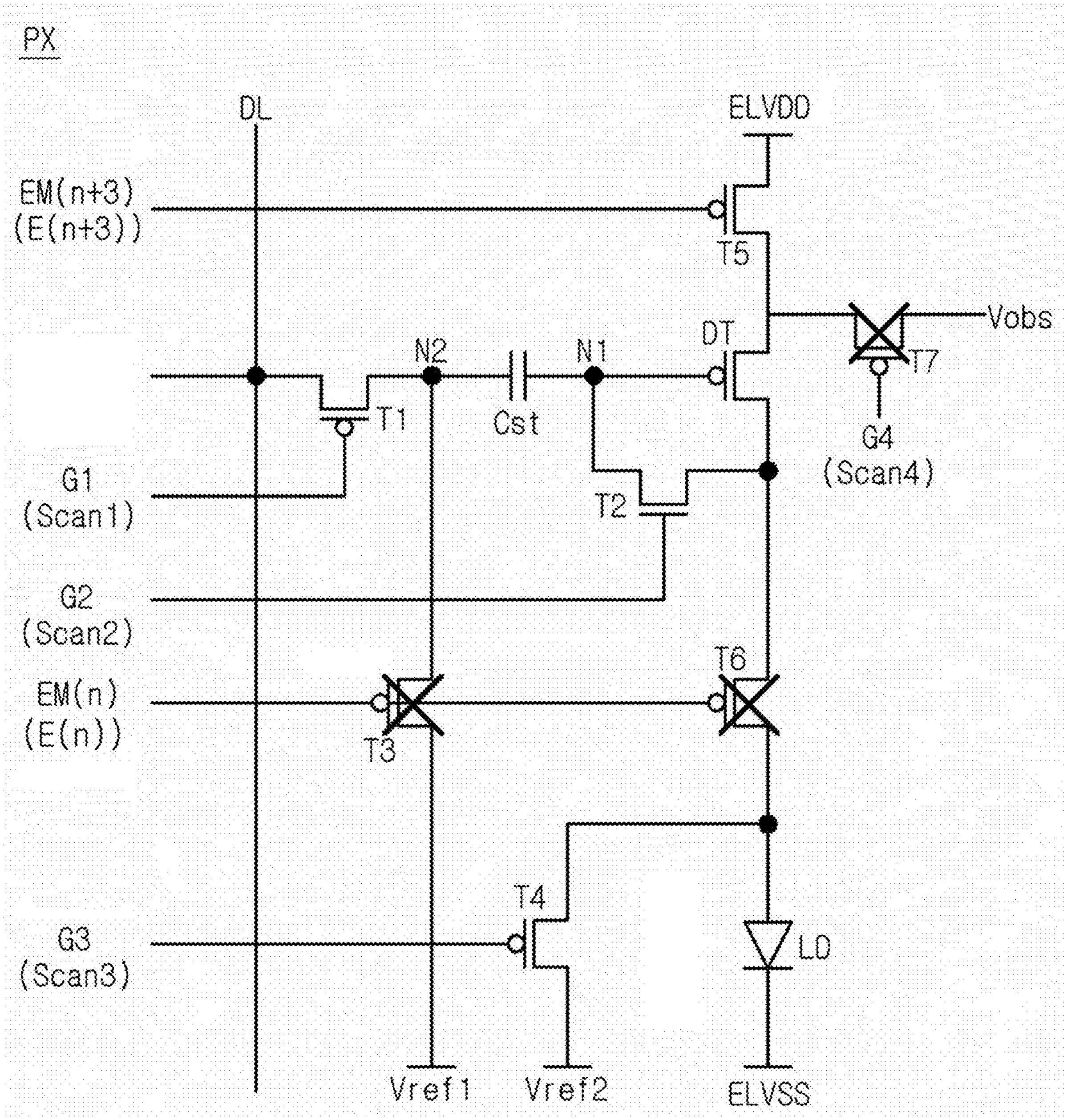

During the sampling and programming period Tsp, a first scan signal Scan1 of the turn-on level is applied to the first gate line G1, and the second scan signal Scan2 of the turn-on level is applied to the second gate line G2. The third scan signal Scan3 of the turn-on level is applied to the third gate line G3, and the n+3-th light emission control signal E(n+3) is applied to the n+3-th light emission line EM(n+3). Accordingly, as shown in FIG. 7, the first transistor T1, the second transistor T2, the fourth transistor T4, and the fifth transistor T5 are turned on. Also, the data voltage is applied to the data line DL during the sampling and programming period Tsp.

Then, the data voltage is applied to the second node N2 through the first transistor T1. Also, as the second transistor T2 is turned on, the driving transistor DT becomes a diode-connected state. When the high potential driving voltage ELVDD is applied to the first electrode of the driving transistor DT through the fifth transistor T5, current may flow between the second electrode and the first electrode of the driving transistor DT. Since the driving transistor DT is in the diode-connected state, the voltage of the first node N1 rises until a gate-source voltage Vgs of the driving transistor DT reaches a voltage corresponding to a difference between the high potential driving voltage ELVDD and the threshold voltage Vth of the driving transistor DT. Therefore, after the sampling and programming period Tsp, the gate electrode of the driving transistor DT is charged with a voltage (ELVDD-Vth) corresponding to a difference between the high potential driving voltage ELVDD and the threshold voltage Vth of the driving transistor DT. A voltage ((ELVDD-Vth)-Vdata) corresponding to a difference between the first node N1 and the second node N2 is stored in the storage capacitor Cst.

That is, the data voltage is programmed into the pixel circuit PX during the sampling and programming period Tsp.

Also, during the sampling and programming period Tsp, the second reference voltage Vref2 may be applied to the anode electrode of the light emitting device LD through the fourth transistor T4, so that the anode electrode is initialized.

During the sampling and programming period Tsp, since a voltage higher than the second reference voltage Vref2 is stored in the driving transistor DT, an appropriate on-bias stress voltage is applied to the driving transistor DT, thereby initializing the characteristics of the driving transistor DT.

Figure 8:
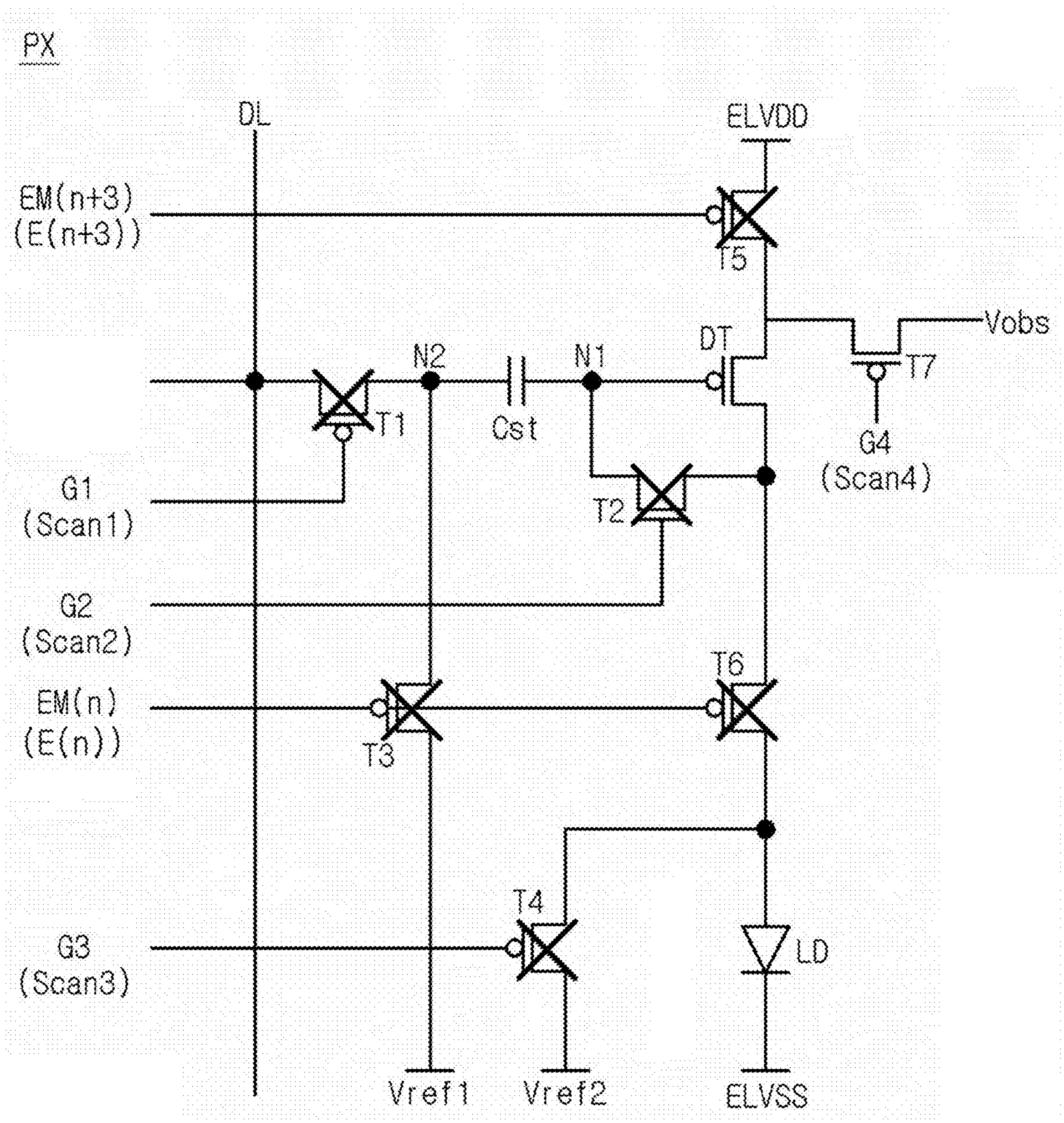

During the second on-bias stress period Tobs2, the fourth scan signal Scan4 of the turn-on level is applied to the fourth gate line G4. Accordingly, as shown in FIG. 8, the seventh transistor T7 is turned on. Then, the on-bias stress voltage Vobs may be applied to the first electrode (i.e., the source electrode) of the driving transistor DT through the seventh transistor T7.

Similarly to the first on-bias stress period Tobs1, during the second on-bias stress period Tobs2, the on-bias stress voltage Vobs having an appropriate level may be selected such that an excessive on-bias stress voltage is not applied to the driving transistor DT. Since a high voltage such as a high potential driving voltage ELVDD component, is stored in the gate electrode of the driving transistor DT in the second on-bias stress period Tob2, the bias voltage can be adjusted to a higher level than that of the first on-bias stress period Tobs1.

For example, when the high potential driving voltage ELVDD is about 10 V and the threshold voltage Vth of the driving transistor DT is about −1 V, the voltage of the gate electrode of the driving transistor DT is about 11 V. During the second on-bias stress period Tobs2, when an on-bias stress voltage of 4 V similar to that in the first on-bias stress period Tobs1 is intended to be applied to the driving transistor DT, the on-bias stress voltage Vobs may be set to about 15 V (second level). The on-bias voltage Vobs of the second level may be finely adjusted in consideration of the data voltage Vdata and the flicker performance of the display panel 60.

As such, in this embodiment, the seventh transistor T7 is turned on at least once within one frame and initializes the characteristics of the driving transistor DT. When the seventh transistor T7 is turned on, the transistors connected to the driving transistor (e.g., the first transistor T1, the second transistor T2, the third transistor T3, and the fifth transistor T5, and the sixth transistor T6) may be turned off.

Figure 9:
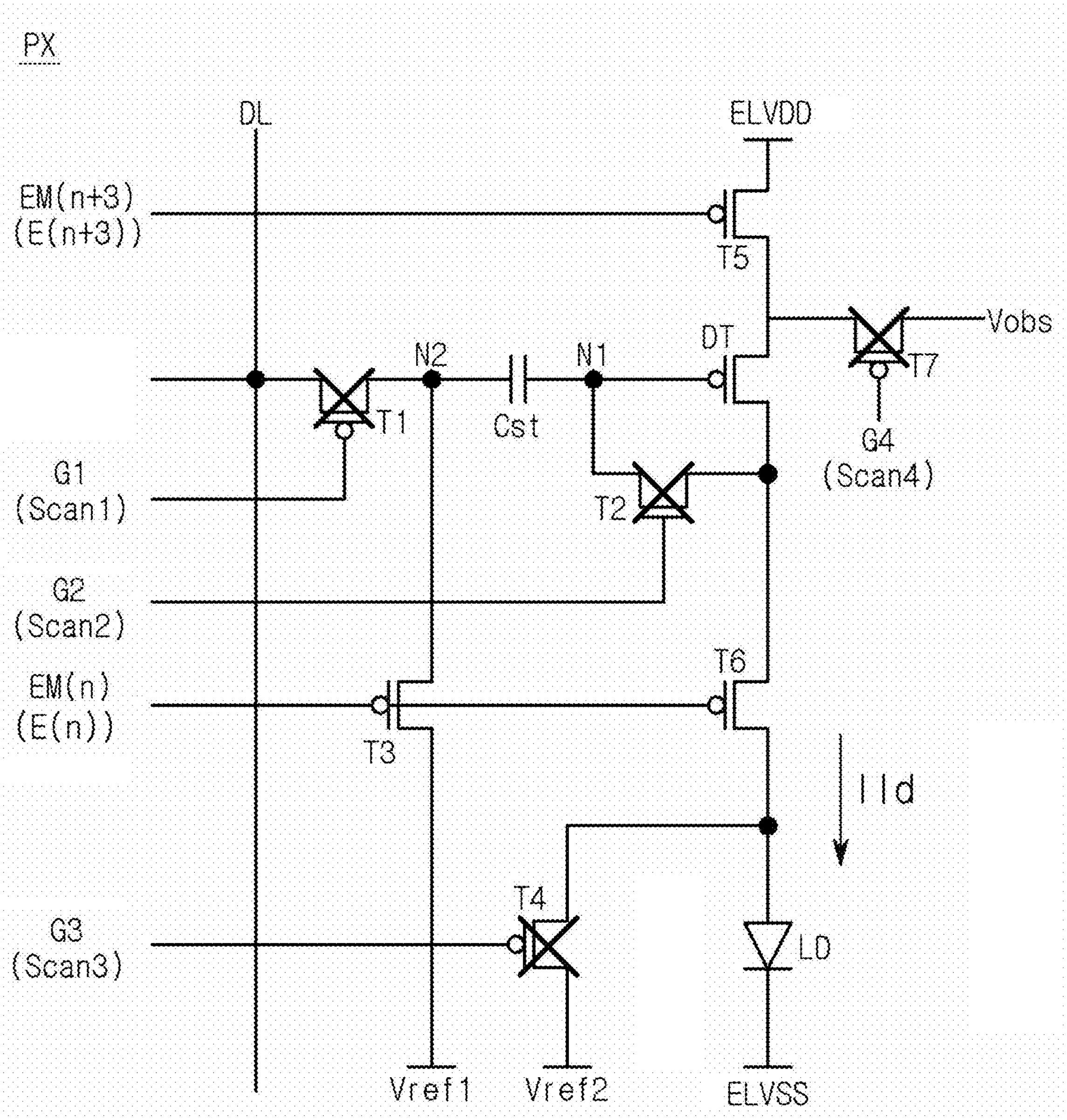

During the light emission period Temi, the n-th light emission control signal E(n) of the turn-on level is applied to the n-th light emission line EM(n), and the n+3-th light emission control signal E(n+3) of the turn-on level is applied to the n+3-th light emission line EM(n+3). Accordingly, as shown in FIG. 9, the third transistor T3, the fifth transistor T5, and the sixth transistor T6 are turned on. Then, a current path from the high potential driving voltage ELVDD through the fifth transistor T5 and the sixth transistor T6 to the light emitting device LD via the driving transistor DT is formed. Here, a driving current Ild having a magnitude corresponding to the data voltage Vdata programmed into the driving transistor DT flows along the current path, thereby enabling the light emitting device LD to emit light.

During the sampling and programming period Tsp, a voltage (Vdata-(ELVDD-Vth) corresponding to a difference between the data voltage Vdata and the voltage (ELVDD-Vth) of the gate electrode of the driving transistor DT is stored in the storage capacitor Cst. During the light emission period Temi, the voltage stored in the storage capacitor Cst is applied to the gate electrode of the driving transistor DT. Accordingly, the driving current Ild applied to the light emitting device LD during the light emission period Temi may be represented by the following Equation 1.

$$Ild=k/2(Vgs+Vth)2=k/2(Vg-Vs+Vth)2=k/2((\mathrm{ELVDD}-Vth)-\mathrm{Vdata}-\mathrm{ELVDD}+Vth)2=k/2(-\mathrm{Vdata})2 \quad \text{Equation (1)}$$

In Equation 1, k/2 is a proportional constant determined by the electron mobility, parasitic capacitance, and channel capacitance of the driving transistor DT.

As shown in Equation 1, the driving current Ild is determined by the data voltage Vdata regardless of the threshold voltage Vth of the driving transistor DT. Therefore, in this embodiment, even if the threshold voltage Vth of the driving transistor DT changes, the driving current Ild corresponding to the data voltage Vdata can be stably supplied.

Meanwhile, the first reference voltage Vref1 is applied to the second node N2 through the third transistor T3 during the light emission period Temi. Then, the storage capacitor Cst is prevented from floating. Accordingly, the voltage of the gate electrode of the driving transistor DT can be stably maintained and the reliability of the pixel circuit PX can be improved.

Figure 10:
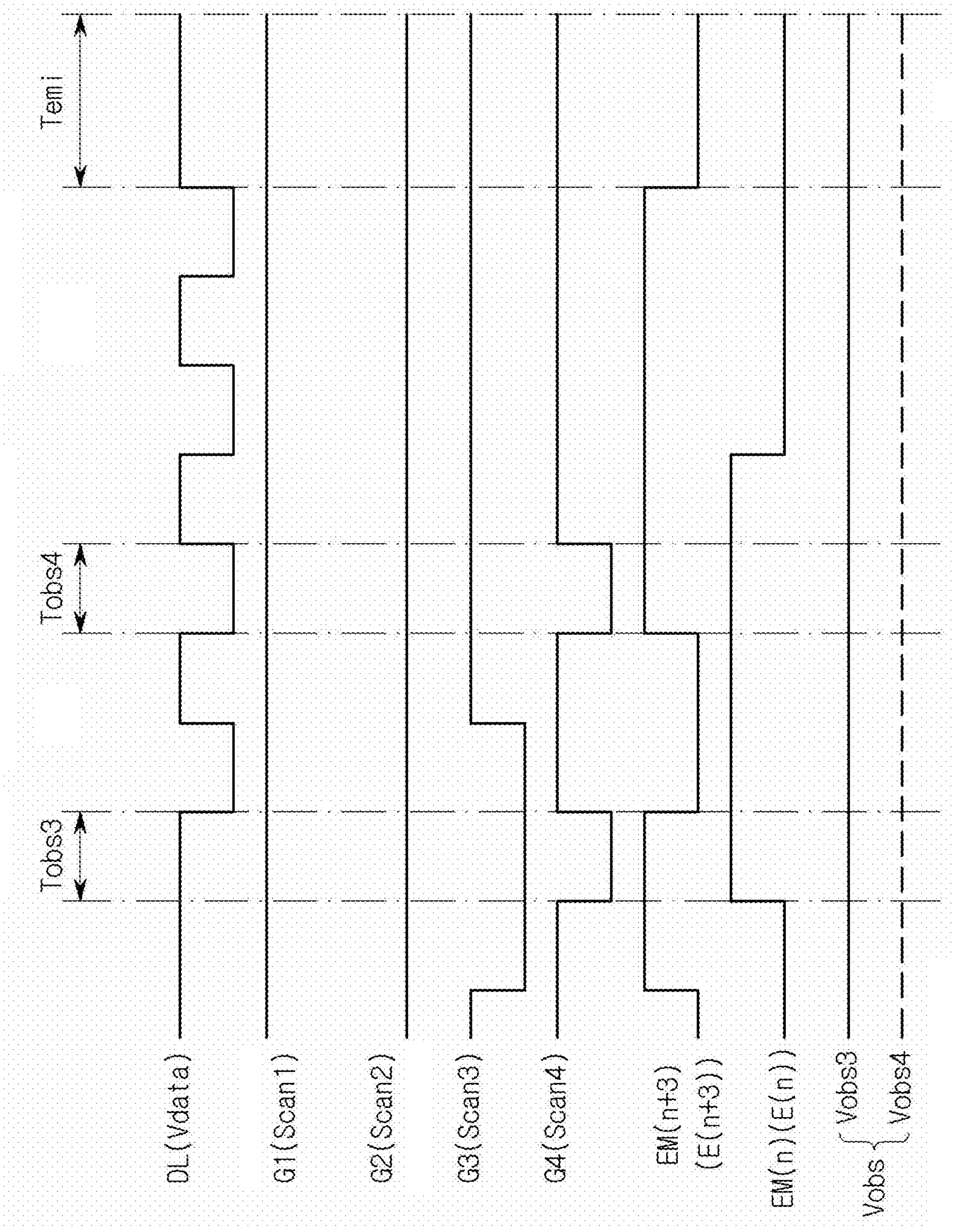
FIG. 10 is a timing diagram showing a driving method in a hold period according to the embodiment.
Figure 11:
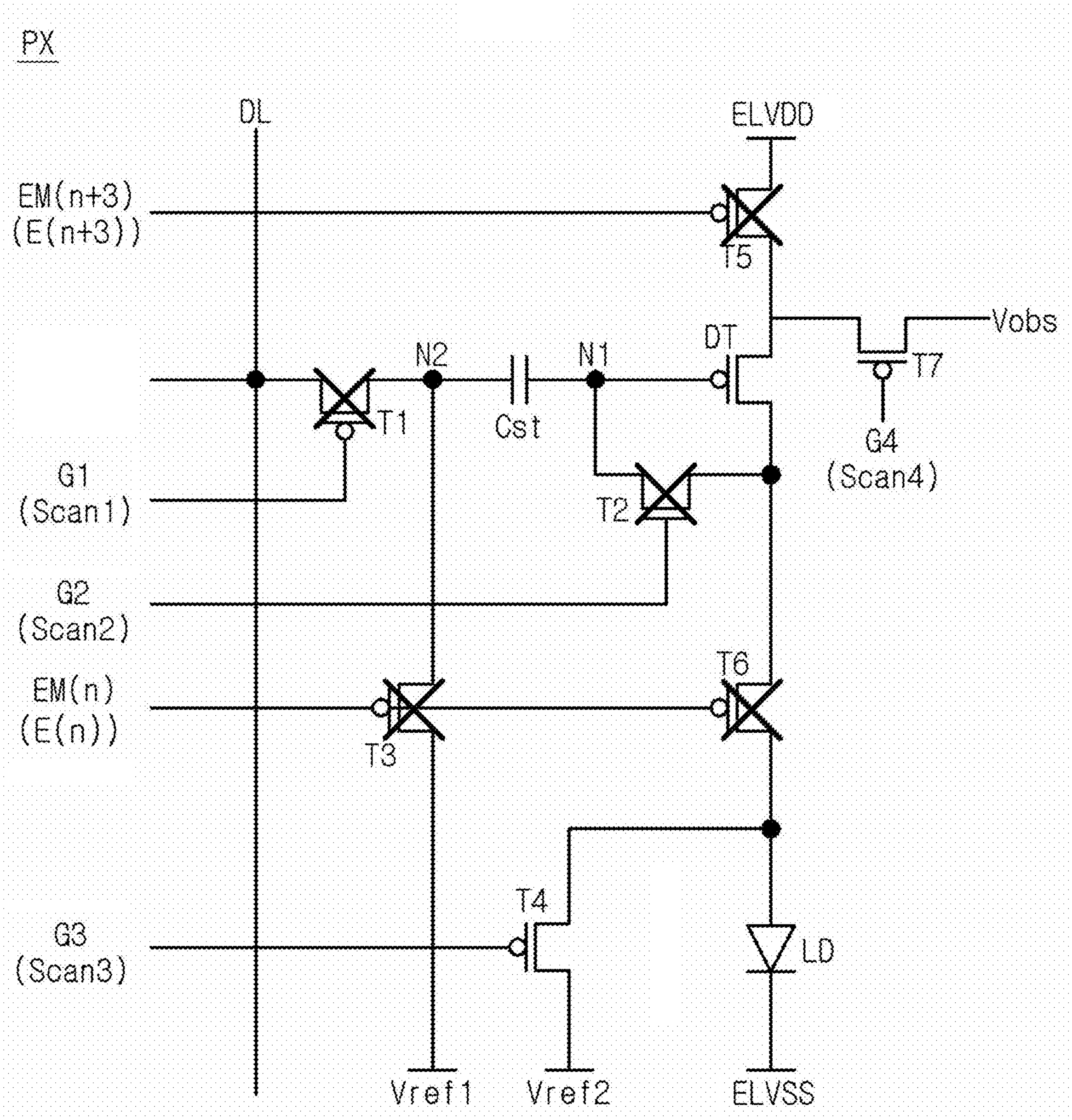
FIGS. 11 to 13 are circuit diagrams for describing operations in the hold period of the pixel circuit according to the embodiment.
Figure 12:
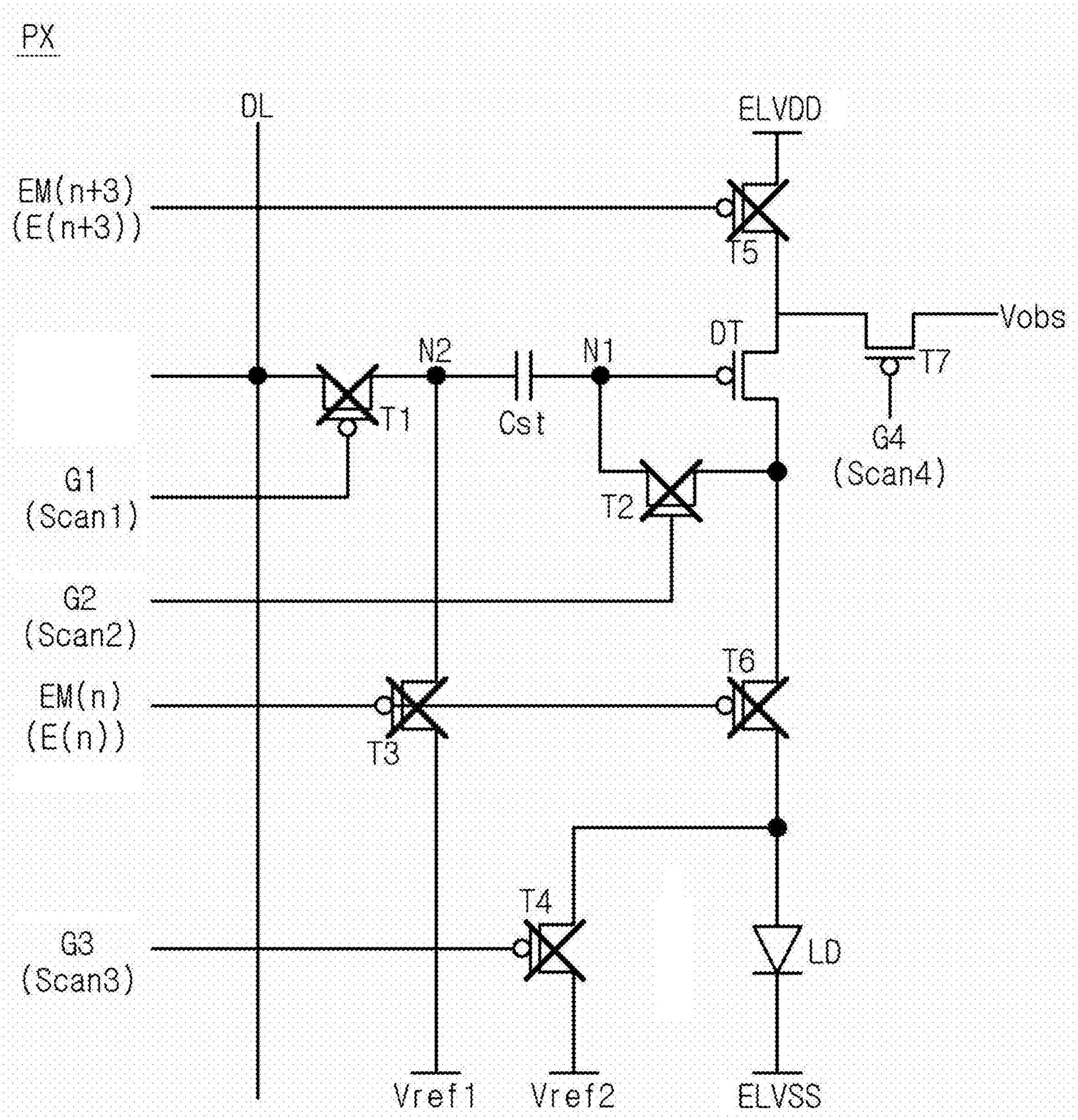
Figure 13:
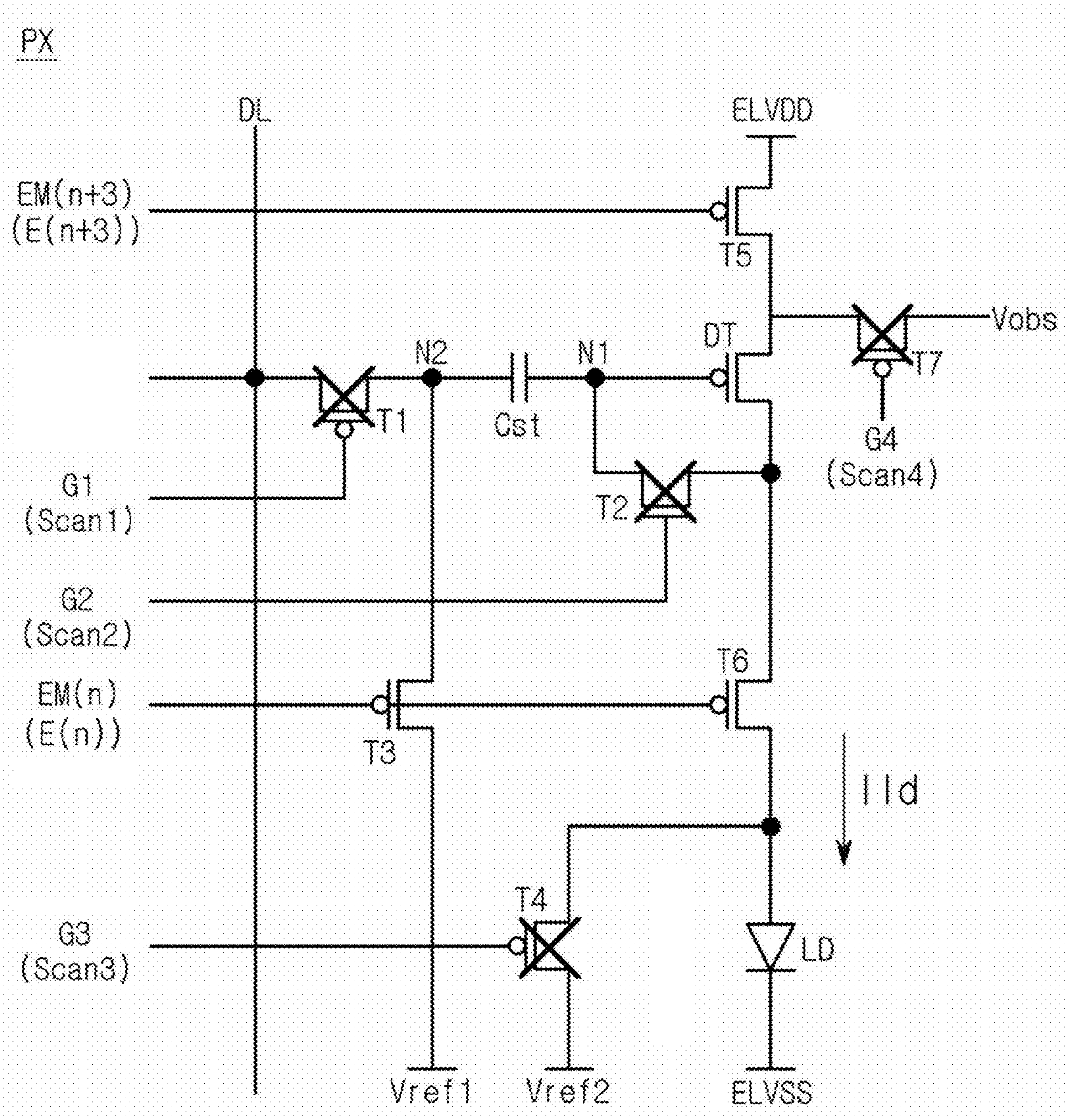

FIG. 10 is a timing diagram showing a driving method in the hold period according to the embodiment. FIGS. 11 to 13 are circuit diagrams for describing operations in the hold period of the pixel circuit according to the embodiment.

During the hold period HP, the initial period Tini and the sample and programming period Tsp for applying a new data voltage Vdata to the pixel circuit PX are omitted. However, during the hold period HP, the data voltage programmed in the previous refresh period RP is maintained in the pixel circuit PX.

Referring to FIG. 10, the hold period HP may include a third on-bias stress period Tobs3, a fourth on-bias stress period Tobs4, and the light emission period Temi.

During the third on-bias stress period Tobs3, the third scan signal Scan3 of the turn-on level is applied to the third gate line G3, and the fourth scan signal Scan4 of the turn-on level is applied to the fourth gate line G4. Accordingly, as shown in FIG. 11, the fourth transistor T4 and the seventh transistor T7 are turned on.

Then, the second reference voltage Vref2 is applied to the anode electrode of the light emitting device LD through the fourth transistor T4 to initialize the anode electrode. In the embodiment, the second reference voltage Vref2 may be set to a voltage that is lower than or equal to the low potential driving voltage ELVSS. Accordingly, the light emitting device LD may not be turned on and the anode electrode may be reset.

Also, the on-bias stress voltage Vobs may be applied to the first electrode (i.e., the source electrode) of the driving transistor DT through the seventh transistor T7. During the hold period HP, the voltage of the gate electrode of the driving transistor DT may be set to the voltage ((ELVDD−Vth)−Vdata) maintained in the storage capacitor Cst in the previous refresh period RP. For example, when the high potential driving voltage ELVDD is about 10 V, the threshold voltage Vth of the driving transistor DT is about −1 V, and the data voltage Vdata is about 3 V, the gate voltage of the driving transistor DT may be about 8 V. During the third on-bias stress period Tobs3, when an on-bias stress voltage of 4 V similar to that in the refresh period RP is intended to be applied to the driving transistor DT, the on-bias stress voltage Vobs may be set to about 12 V (third level). Since the voltage maintained by the storage capacitor Cst is applied to the gate electrode of the driving transistor DT in the third on-bias stress period Tobs3, an on-bias stress voltage of a lower level than that in the second on-bias stress period Tobs2 in which the high potential driving voltage ELVDD is directly applied may be applied. Here, the third level is higher than the first level applied in the first on-bias stress period Tobs1.

During the fourth on-bias stress period Tobs4, the fourth scan signal Scan4 of the turn-on level is applied to the fourth gate line G4. Accordingly, as shown in FIG. 12, the seventh transistor T7 is turned on. Also, the on-bias stress voltage Vobs may be applied to the first electrode (i.e., the source electrode) of the driving transistor DT through the seventh transistor T7.

Since the voltage of the gate electrode of the driving transistor DT is maintained constant during the hold period HP, the on-bias stress voltage Vobs at the same level as that in the third on-bias stress period Tobs3 may be applied in the fourth on-bias stress period Tobs4.

As such, in this embodiment, the seventh transistor T7 is turned on at least once within one frame and initializes the characteristics of the driving transistor DT. When the seventh transistor T7 is turned on, the transistors connected to the driving transistor (e.g., the first transistor T1, the second transistor T2, the third transistor T3, and the fifth transistor T5, and the sixth transistor T6) may be turned off.

During the light emission period Temi, the n-th light emission control signal E(n) of the turn-on level is applied to the n-th light emission line EM(n), and the n+3-th light emission control signal E(n+3) of the turn-on level is applied to the n+3-th light emission line EM(n+3). Accordingly, as shown in FIG. 13, the third transistor T3, the fifth transistor T5, and the sixth transistor T6 are turned on. Then, a current path from the high potential driving voltage ELVDD through the fifth transistor T5 and the sixth transistor T6 to the light emitting device LD via the driving transistor DT is formed. Here, a driving current Ild having a magnitude corresponding to the data voltage Vdata programmed into the driving transistor DT in the previous refresh period RP flows along the current path, thereby enabling the light emitting device LD to emit light.

As described above, when the display device 1 according to the embodiment is driven in the variable refresh rate mode, one frame includes at least one refresh period RP and at least one hold period HP. The refresh period RP and the hold period HP each includes at least one or more on-bias stress periods Tobs1 to Tobs4, and the on-bias stress voltage Vobs in each of the on-bias stress period Tobs1 to Tobs4 is variable.

Figure 14:
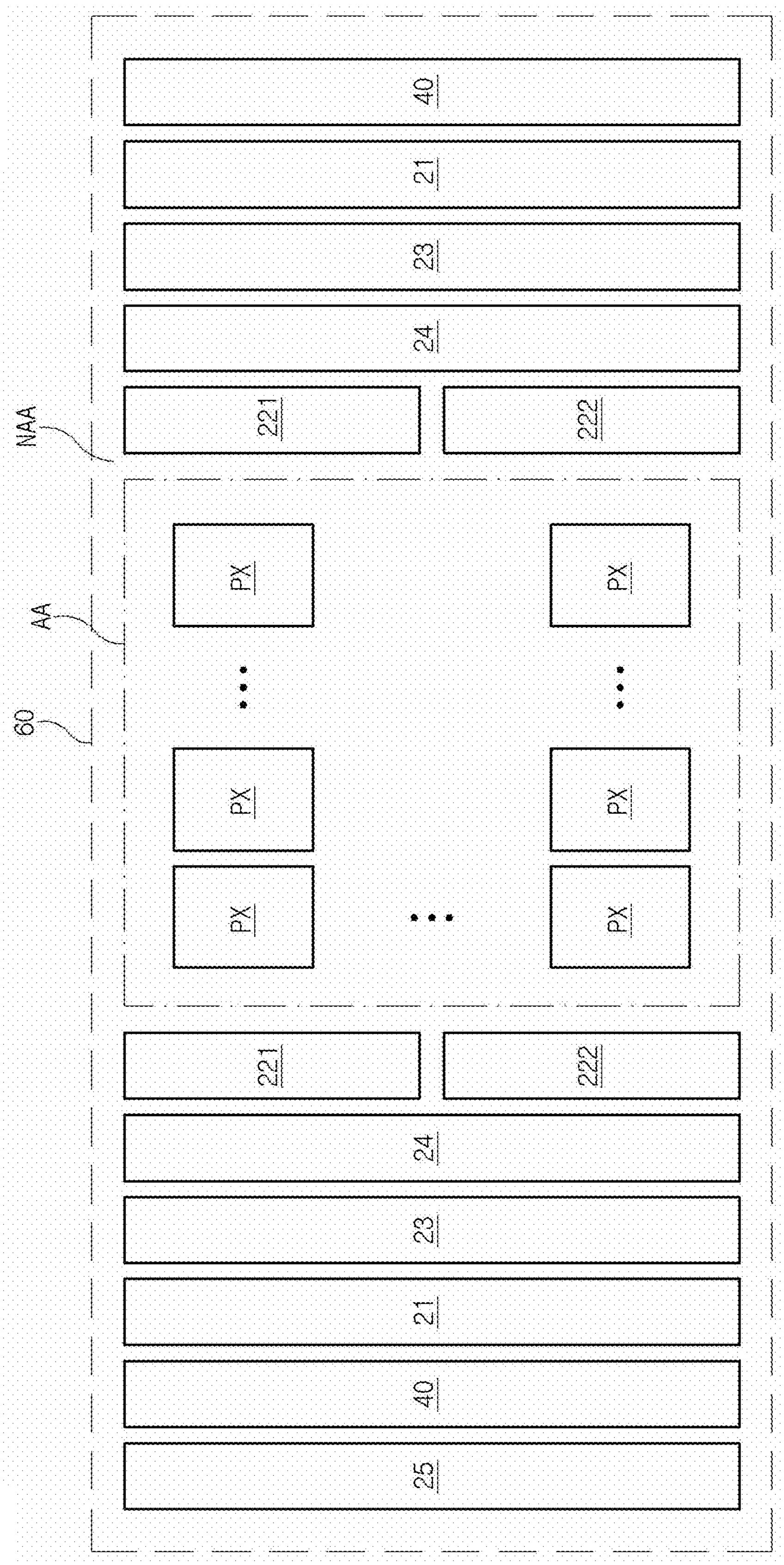
FIG. 14 is a view showing schematically a scan driving unit and a light emitting driver shown in FIG. 1.

FIG. 14 is a view showing schematically a scan driving unit and the light emitting driver shown in FIG. 1.

Referring to FIG. 14, the display panel 60 may include a display area AA in which a plurality of pixel circuits PX is provided to display an image. A non-display area NAA (or bezel area) surrounding the display area AA may be provided on the outside of the display area AA.

The gate driver 20 and the light emitting driver 40 may be formed on one or both sides of the display panel 60 in an in-panel manner. For example, as shown, the gate driver 20 and the light emitting driver 40 may be provided on the left or right side of the display panel 60. In this embodiment, a dual driving method may be implemented in which the gate driver 20 and the light emitting driver 40 are provided on the left and right sides of the display area AA and are driven in a dual manner.

For example, on the left and right sides of the display area AA, a first gate stage circuit 21 which outputs a first scan signal Scan1, an odd-numbered second gate stage circuit 221 which outputs an odd-numbered second scan signal Scan2, an even-numbered second gate stage circuit 222 which outputs an even-numbered second scan signal Scan2, a third gate stage circuit 23 which outputs a third scan signal Scan3, and a fourth gate stage circuit 24 which outputs a fourth scan signal Scan4 may be provided. In the embodiment, the second gate stage circuits 221 and 222 may be disposed closest to the display area AA and in parallel with each other, and the first gate stage circuit 21 may be disposed farthest from the display area AA. However, the embodiment is not limited thereto.

Also, the light emitting driver 40 which outputs the light emission control signal E may be provided on the left and right sides of the display area AA, respectively. The light emitting driver 40 may be disposed farther from the display area AA than the gate driver 20, and is not limited thereto.

In the embodiment, in order to apply the on-bias stress voltage to the driving transistor DT, an on-bias stage circuit 25 for swinging the on-bias voltage may be separately provided. The on-bias stage circuit 25 may be integrally formed with the gate driver 20 or the light emitting driver 40 or may be provided as a separate driver. The on-bias stage circuit 25 may be disposed on one side of the display area AA. For example, the on-bias stage circuit 25 may be disposed farthest from the display area AA, and is not limited thereto.

Figure 15:
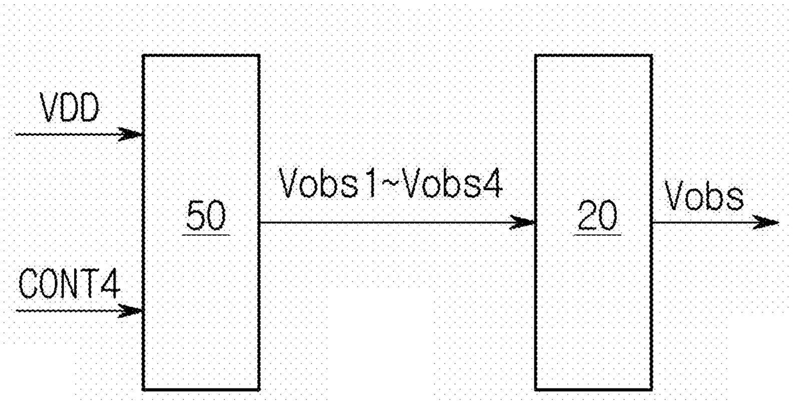
FIG. 15 is a view showing schematically a power supply and a gate driver shown in FIG. 1.

FIG. 15 is a view showing schematically the power supply and the gate driver shown in FIG. 1.

Referring to FIG. 15, the power supply 50 may communicate with the outside (e.g., the timing controller 10) through one or more predetermined interfaces. For example, the interface may include a low voltage D differential signaling (LVDS) interface, an EPI interface, a serial peripheral interface (SPI), and the like. The power supply 50 may receive a power supply control signal CONT4 applied from the outside through the interface.

The power supply 50 may convert a power supply voltage VDD applied from the outside and supply to each of the components of the display device 1. For example, the power supply 50 may convert an AC power supply voltage VDD into a DC voltage and supply to the gate driver 20, the data driver 30, and the light emitting driver 40.

In the embodiment, the power supply 50 may generate the on-bias stress voltages Vobs1 to Vobs4 by converting the power supply voltage VDD. In the embodiment, the power supply 50 may generate and output on-bias stress voltages Vobs1 to Vobs4 having different levels according to a driving period within one frame of the pixel circuit PX.

In the embodiment, the gate driver 20 may include the on-bias stage circuit 25 for outputting the on-bias stress voltage Vobs. In such an embodiment, the gate driver 20 may supply the on-bias stress voltages Vobs1 to Vobs4 output from the power supply 50 to the pixel circuit PX.

While the embodiment of the present disclosure has been described with reference to the accompanying drawings, it can be understood by those skilled in the art that the present disclosure can be embodied in other specific forms without departing from its spirit or essential characteristics. Therefore, the foregoing embodiments and advantages are merely exemplary and are not to be construed as limiting the present disclosure. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

A pixel circuit, a driving method of the pixel circuit, and a display device including the pixel circuit according to the embodiments can prevent leakage current caused by devices when driven at a low frequency in the variable refresh rate mode, and can improve IR drop during light emission.

Also, the pixel circuit, the driving method of the pixel circuit, and the display device including the pixel circuit according to the embodiments can reduce hysteresis of the driving transistor in the variable refresh rate mode to prevent flicker and can uniformly control overall luminance.

It will be apparent to those skilled in the art that various modifications and variations can be made in the pixel circuit, the driving method of the pixel circuit, and the display device including the pixel circuit of the present disclosure without departing from the technical idea or scope of the disclosure. Thus, it is intended that the present disclosure cover the modifications and variations of this disclosure provided they come within the scope of the appended claims and their equivalents.

What is claimed is:

1. A pixel circuit, comprising:

a light emitting device configured to emit light with a luminance corresponding to an amount of driving current applied thereto;

a driving transistor configured to control the amount of the driving current applied to the light emitting device;

a storage capacitor which is connected to the driving transistor;

a first transistor configured to be turned on according to a first scan signal and transmit a data voltage to the storage capacitor; and a second transistor configured to be turned on according to a second scan signal and cause the driving transistor to be diode-connected, wherein the driving transistor and the first transistor are low temperature poly-silicon (LTPS) thin film transistors, wherein the second transistor is an oxide semiconductor thin film transistor, and wherein after a sampling and programming period, a gate electrode of the driving transistor is charged with a voltage corresponding to a difference between a high potential driving voltage and a threshold voltage of the driving transistor.

2. The pixel circuit of claim 1, wherein a first electrode of the driving transistor is connected to a high potential driving voltage node, and a second electrode of the driving transistor is connected to the light emitting device, and the gate electrode of the driving transistor is connected to a first node, wherein the first transistor is connected between a second node and a data line for applying the data voltage, and a gate electrode of the first transistor is connected to a first gate line for applying the first scan signal, wherein the storage capacitor is connected between the first node and the second node, and wherein the second transistor is connected between the first node and the second electrode of the driving transistor, and a gate electrode of the second transistor is connected to a second gate line for applying the second scan signal.

3. The pixel circuit of claim 2, further comprising:

a third transistor which is connected between the second node and a first reference voltage node and has a gate electrode connected to an n-th light emission line for applying an n-th light emission control signal; and a fourth transistor which is connected between the light emitting device and a second reference voltage node and has a gate electrode connected to a third gate line for applying a third scan signal.

4. The pixel circuit of claim 3, further comprising:

a fifth transistor which is connected between the high potential driving voltage node and the first electrode of the driving transistor and has a gate electrode connected to an n+3-th light emission line for applying an n+3-th light emission control signal; and a sixth transistor which is connected between the second electrode of the driving transistor and an electrode of the light emitting device and has a gate electrode connected to the n-th light emission line for applying the n-th light emission control signal.

5. The pixel circuit of claim 4, further comprising a seventh transistor which is connected between an on-bias stress voltage node and the first electrode of the driving transistor and has a gate electrode connected to a fourth gate line for applying a fourth scan signal.

6. The pixel circuit of claim 5, wherein the seventh transistor is configured to be turned on at least once for one frame and apply an on-bias stress voltage to the driving transistor, and initialize characteristics of the driving transistor, and wherein the on-bias stress voltage is to be varied to a different level according to a driving period within the one frame.

7. The pixel circuit of claim 1, wherein the storage capacitor is connected directly between the first transistor and the second transistor without being connected directly to a high potential driving voltage node.

8. The pixel circuit of claim 1, further comprising:

a third transistor which is connected between the storage capacitor and a first reference voltage node and has a gate electrode connected to a light emission line for applying a light emission control signal; and a fourth transistor which is connected between a high potential driving voltage node and a first electrode of the driving transistor and has a gate electrode connected to a second light emission line for applying a second light emission control signal.

9. A method for driving a pixel circuit for one frame in a variable refresh rate mode, the method comprising:

programming each pixel circuit with a data voltage during at least one refresh period; and controlling a light emitting device of the pixel circuit to emit light in correspondence to the programmed data voltage during a previous refresh period during at least one hold period, wherein the at least one refresh period and the at least one hold period each comprises at least one on-bias stress period in which an on-bias stress voltage is applied to a driving transistor of the pixel circuit and characteristics of the driving transistor are reset, wherein the on-bias stress voltage is varied in at least some of the at least one on-bias stress period, and wherein during the at least one hold period:

the on-bias stress voltage is at a first voltage level during a first period of the at least one on-bias stress period and is at a second voltage level during a second period of the at least one on-bias stress period; and the second voltage level is different from the first voltage level.

10. The method of claim 9, wherein the at least one refresh period comprises:

an initial period in which the data voltage stored in advance in the pixel circuit is initialized;

a sampling and programming period in which the data voltage is programmed into the pixel circuit;

a light emission period in which the light emitting device emits light in correspondence to the data voltage programmed into the pixel circuit; and the at least one on-bias stress period which is disposed at least once before the light emission period.

11. The method of claim 10, wherein the at least one on-bias stress period of the at least one refresh period comprises:

a first on-bias stress period which is disposed between the initial period and the sampling and programming period and in which the on-bias stress voltage of a first level is applied to the driving transistor; and a second on-bias stress period which is disposed between the sampling and programming period and the light emission period and in which the on-bias stress voltage of a second level higher than the first level is applied to the driving transistor.

12. The method of claim 11, wherein the at least one hold period comprises:

a light emission period in which the light emitting device emits light in correspondence to the programmed data voltage during the previous refresh period; and the at least one on-bias stress period which is disposed at least once before the light emission period.

13. The method of claim 12, wherein the at least one on-bias stress period of the at least one hold period comprises:

a third on-bias stress period which is disposed before the light emission period and in which the on-bias stress voltage of a third level that is higher than the first level and is lower than the second level is applied to the driving transistor; and a fourth on-bias stress period which is disposed between the third on-bias stress period and the light emission period and in which the on-bias stress voltage of a fourth level that is same as the third level is applied to the driving transistor.

14. The method of claim 13, wherein the pixel circuit comprises:

the driving transistor which has a first electrode connected to a high potential driving voltage node, a second electrode connected to the light emitting device, and a gate electrode connected to a first node;

a first transistor which is connected between a second node and a data line for applying the data voltage and has a gate electrode connected to a first gate line for applying a first scan signal;

a storage capacitor which is connected between the first node and the second node;

a second transistor which is connected between the first node and the second electrode of the driving transistor and has a gate electrode connected to a second gate line for applying a second scan signal; and a seventh transistor which is connected between an on-bias stress voltage node for applying the on-bias stress voltage and the first electrode of the driving transistor and has a gate electrode connected to a fourth gate line for applying a fourth scan signal.

15. The method of claim 14, wherein only the fourth scan signal is applied at a turn-on level during the at least one on-bias stress period, and thus, the on-bias stress voltage is applied to the driving transistor through the seventh transistor.

16. The method of claim 9, wherein the on-bias stress voltage reduces hysteresis of the driving transistor and is varied to a different voltage level according to a driving period within the one frame.

17. A display device, comprising:

a display panel on which pixel circuits are disposed;

a gate driver configured to apply scan signals to the pixel circuits;

a data driver configured to apply data signals to the pixel circuits;

a light emitting driver configured to apply light emission control signals to the pixel circuits;

a timing controller configured to control operations of the gate driver and the data driver; and a power supply configured to generate a driving voltage and an on-bias stress voltage to be applied to the pixel circuits, wherein each of the pixel circuits comprises:

a light emitting device configured to emit light with a luminance corresponding to an amount of driving current applied thereto;

a driving transistor configured to control the amount of the driving current applied to the light emitting device;

a storage capacitor which is connected to the driving transistor;

a first transistor configured to be turned on according to a first scan signal and transmit a data voltage to the storage capacitor; and a second transistor configured to be turned on according to a second scan signal and cause the driving transistor to be diode-connected, wherein the driving transistor and the first transistor are low temperature poly-silicon (LTPS) thin film transistors, wherein the second transistor is an oxide semiconductor thin film transistor, and wherein the storage capacitor is connected between the first transistor and the second transistor without being connected directly to a high potential driving voltage node.

18. The display device of claim 17, wherein the display panel comprises a display area in which the pixel circuits are disposed and a non-display area which surrounds the display area, and wherein the gate driver and the light emitting driver are disposed in the non-display area on left and right sides of the display panel.

19. The display device of claim 18, wherein the gate driver comprises: in the non-display area on the left and right sides, a first gate stage circuit configured to output a first scan signal, an odd-numbered second gate stage circuit configured to output an odd-numbered second scan signal, an even-numbered second gate stage circuit configured to output an even-numbered second scan signal, a third gate stage circuit configured to output a third scan signal, and a fourth gate stage circuit configured to output a fourth scan signal.

20. The display device of claim 18, wherein the light emitting driver is disposed farther from the display area than the gate driver.

* * * * *